United States Patent [19]
Wakabayashi et al.

[11] Patent Number: 5,751,367
[45] Date of Patent: May 12, 1998

[54] VIDEO SIGNAL DETECTING APPARATUS

[75] Inventors: Toshitsugu Wakabayashi; Masaki Kobayashi, both of Nagasaki, Japan

[73] Assignee: Mitsubishi Denki Kabushiki Kaisha, Tokyo, Japan

[21] Appl. No.: 383,924

[22] Filed: Feb. 6, 1995

[30] Foreign Application Priority Data

Aug. 30, 1994 [JP] Japan .................. 6-205564

[51] Int. Cl.$^6$ .................................................. H04N 5/04
[52] U.S. Cl. ................................ 348/511; 348/500
[58] Field of Search ........................ 348/511, 465, 348/529, 530, 525, 540, 546, 547, 548, 473, 478, 479, 500; H04N 5/04, 5/06, 5/05, 7/08, 7/087

[56] References Cited

U.S. PATENT DOCUMENTS

| | | | |
|---|---|---|---|
| 3,532,810 | 10/1970 | Steinberg | 348/530 |
| 3,721,905 | 3/1973 | Newman | 348/525 |
| 4,015,288 | 3/1977 | Ebihara et al. | 348/498 |
| 4,115,811 | 9/1978 | Goff | 358/167 |
| 4,120,589 | 10/1978 | Mima et al. | 356/121 |
| 4,385,319 | 5/1983 | Hasegawa | 358/153 |
| 4,542,415 | 9/1985 | Kimura | 358/342 |
| 4,984,255 | 1/1991 | Davis et al. | 375/106 |
| 5,058,157 | 10/1991 | Ryan | 380/11 |
| 5,177,612 | 1/1993 | Nakamura et al. | 358/183 |
| 5,223,930 | 6/1993 | Zato | 348/478 |
| 5,436,667 | 7/1995 | Lagoni et al. | 348/525 |

FOREIGN PATENT DOCUMENTS

| | | | |
|---|---|---|---|
| 61-264871 | 11/1986 | Japan . | |
| 62-72278 | 4/1987 | Japan . | |
| 5165451 | 7/1993 | Japan | G09G 5/12 |
| 5297815 | 11/1993 | Japan | G09G 1/04 |

Primary Examiner—John K. Peng
Assistant Examiner—Chris Grant
Attorney, Agent, or Firm—Burns, Doane, Swecker & Mathis, LLP

[57] ABSTRACT

A video signal is inputted into a video signal detecting apparatus including one monostable multivibrator to latch in response to a rise of the video signal, and the other monostable multivibrator to latch in response to a fall of the video signal. Output from the multivibrators are ORed in an OR circuit which outputs the OR output as a video detecting signal. A control logic circuit adjusts an image position, image widths and so forth on a display screen depending upon the video detecting signal and horizontal and vertical synchronizing signals.

14 Claims, 9 Drawing Sheets

VIDEO SIGNAL DETECTING APPARATUS

BACKGROUND OF THE INVENTION

1. Field of the Invention

The present invention relates to a video signal detecting apparatus used to adjust an image position and horizontal and vertical widths of an image on an image display by detecting a position of an image signal, a high-frequency signal, with respect to horizontal and vertical synchronizing pulses.

2. Description of the Related Art

FIG. 10 is a circuit diagram showing a conventional video signal detecting apparatus. In the drawing, reference numeral 1 means a power source terminal, 2 is a video input terminal, 19 is a capacitor for cutting a dc component of a video input signal, 20 and 21 are bias resistors, and 3 is a buffer transistor taking as input the video input signal whose dc component has been cut.

Further, reference numeral 4 means a resistor connected to an emitter of the buffer transistor 3, 70 is an analog/digital (A/D) converter, 71 is a clock input terminal for a sampling clock inputted into the A/D converter 70, and 16 is a control logic circuit in which an image position and horizontal and vertical widths are calculated depending upon output from the A/D converter 70 to control the image position and the horizontal and vertical widths as required.

FIG. 11A shows a video input signal (a full white signal) inputted into the video input terminal 2. FIG. 11B shows the sampling clock. FIG. 11C shows an output signal (i.e., a signal having higher frequency than that of another signal, such as cross hatching or one dot signal on display) from the A/D converter 70.

First, the video input signal shown in FIG. 11A is inputted through the video input terminal 2, and a dc component of the video input signal shown in FIG. 11A is cut by the dc component cutting capacitor 19. Subsequently, the video input signal shown in FIG. 11A is biased by the resistors 20 and 21 to have a biased signal waveform, and is inputted into a base of the buffer transistor 3.

The video input signal is outputted from the emitter after adjustment in the buffer transistor 3, and is inputted into the A/D converter 70 to be sampled by the sampling clock shown in FIG. 11B from the clock input terminal 71. The sampled video input signal is inputted into the control logic circuit 16 in which the image position and width are controlled in the horizontal and vertical directions.

In this case, when the full white signal as shown in FIG. 11A is inputted as the video input signal into the video input terminal 2, the A/D converter 70 outputs digital voltage data "00" to "FF" sampled by the sampling clock shown in FIG. 11B, that is, outputs data by which video input amplitude is varied to range from zero to the maximum value.

The video input terminal 2 may take as input a high-frequency signal having a pulse width $T_{22}$ as shown by the output signal in FIG. 11C such as cross hatching or one dot signal as shown in FIG. 11C. In such a case, when a sampling cycle time $T_{22}$ is shorter than a sampling cycle time $T_{21}$, data can be outputted as far as any signal is present at a sampling time as at a time $t_{20}$. However, when no video input signal waveform is present at a sampling time as at a time $t_{21}$, output data is identical with data indicative of "Low". That is, it is impossible to recognize the video input signal.

The conventional video signal detecting apparatus is provided as set forth above. Hence, when the input signal has frequency higher than that of the sampling clock in the A/D converter 70, such a video input signal cannot be detected. On the other hand, the use of the A/D converter having a rapid sampling speed causes some problems of, for example, more expensive apparatus. Further, since micro voltage is transformed into transistor-transistor logic level in the apparatus, there are other problems such as generation of unnecessary electromagnetic radiation.

SUMMARY OF THE INVENTION

In view of the foregoing, it is an object of the present invention to provide a video signal detecting apparatus which can accurately detect a video signal even in case that the video signal has a high frequency.

According to the present invention, for achieving the above-mentioned objects, there is provided a video signal detecting apparatus including a first latch circuit to latch in response to a rise of a video signal, a second latch circuit to latch in response to a fall of the video signal, and an OR circuit in which an output signal of the first latch circuit and an output signal of the second latch circuit are ORed to output the OR output as a video detecting signal. For example, count is made of a time period from a fall of a synchronizing signal to a first video detecting signal, and of a time period from the last video detecting signal to the next cycle synchronizing signal. Then, it is possible to adjust an image position and image widths on a display by calculating a phase position of the video signal by a microcomputer and so forth.

As set forth above, it is possible to latch the video signal in response to the rise and the fall of the video signal so as to accurately detect the video signal even in case that the video signal has a high frequency.

Alternatively, there may be provided a comparator to compare an input video signal with predetermined reference voltage so as to output a video detecting signal for a period in which the video signal exceeds the reference voltage in level. In this case, it is possible to detect the video signal without an amplifier and so forth.

Alternatively, the first latch circuit and the second latch circuit may be connected to a collector resistor of a buffer transistor for outputting the video input signal. In this case, it is possible to detect the video signal without exerting adverse effect on an inherent video amplifier characteristic by fetching the high frequency signal at the collector resistor of the buffer transistor.

Alternatively, a switch circuit may be connected to a video signal input terminal to cut off input of the video signal when no autocalibration is used. In this case, it is possible to avoid transmission of the video signal to circuits in the next and later stages, and prevent unnecessary radiation.

Alternatively, the first latch circuit and the second latch circuit may be provided with reset terminals into which control signals are inputted to cut off the transmission of high frequency signals to the circuits in the next and later stages. In this case, the input of the control signal can avoid the transmission of the high frequency signals to the circuits in the next and later stages, and avoid unnecessary radiation.

The above and further objects and novel features of the invention will more fully appear from the following detailed description when the same is read in connection with the accompanying drawings. It is to be expressly understood, however, that the drawings are for purpose of illustration only and are not intended as a definition of the limits of the invention.

DETAILED DESCRIPTION OF THE PREFERRED EMBODIMENTS

Preferred embodiments of the invention will now be described in detail referring to the accompanying drawings.

Embodiment 1

Figure 1:
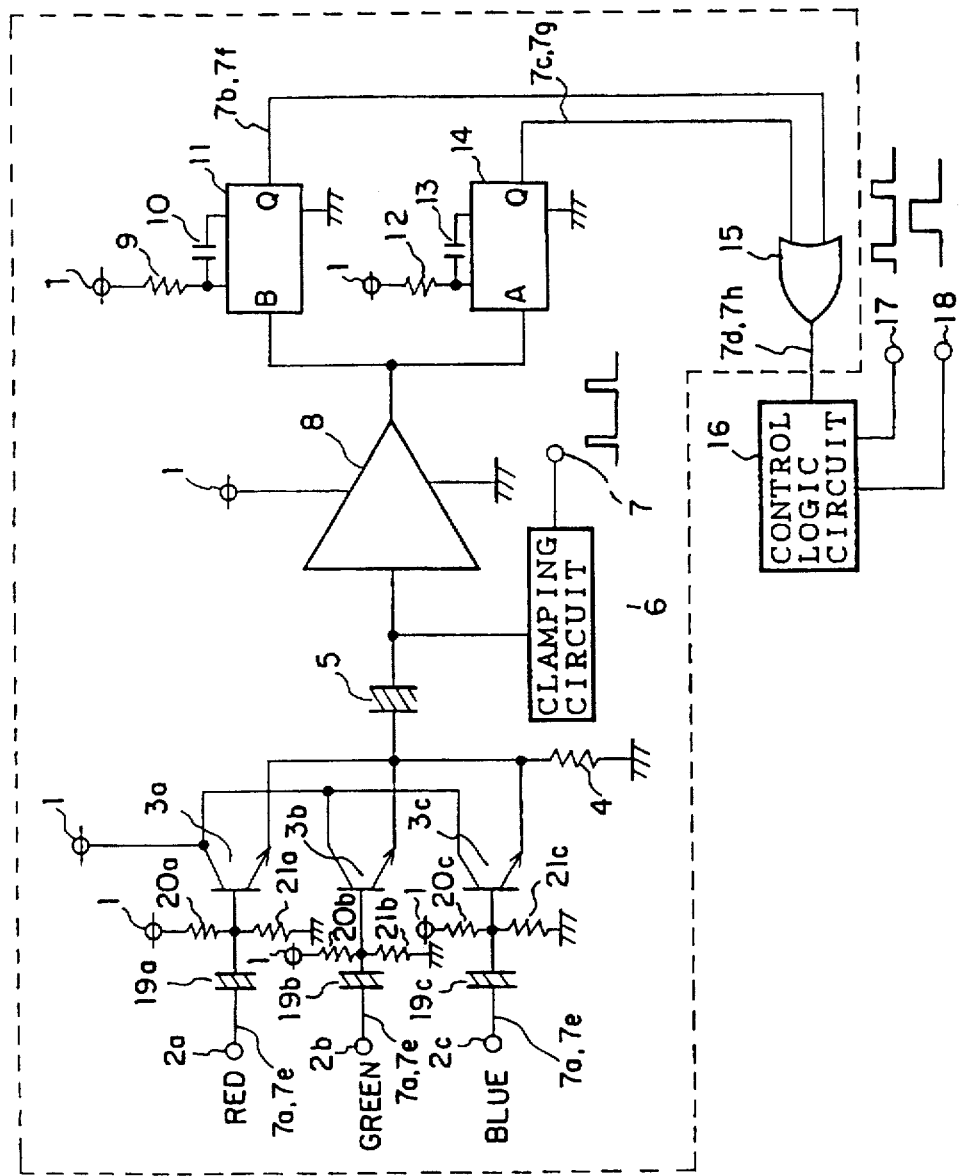
FIG. 1 is a circuit diagram showing one embodiment of a video signal detecting apparatus according to the present invention.

In FIG. 1, reference numerals 2a, 2b, and 2c mean video input terminals receiving as inputs video input signals corresponding to red, green, and blue. 19a, 19b, and 19c are dc component cutting capacitors, 20a, 20b, 20c, 21a, 21b, and 21c are bias resistors, and 3a, 3b, and 3c are transistors. Emitters of the respective transistors are interconnected via a common line to be grounded through a resistor 4. Reference numeral 5 means a dc component cutting capacitor, 7 is a clamping pulse input terminal, 6 is a clamping circuit, and 8 is a non-inverting amplifier taking as input the OR of the transistors 3a, 3b, and 3c for amplification. Reference numerals 11 and 14 are monostable multivibrators serving as a first latch circuit and as a second latch circuit connected to an output terminal of the non-inverting amplifier 8. The monostable multivibrators 11 and 14 respectively have a time constant determined by the resistor 9 and the capacitor 10, and a time constant determined by the resistor 12 and the capacitor 13.

Reference numeral 15 means an OR circuit taking as input output from the monostable multivibrators 11 and 14. Output from the OR circuit 15 is inputted into a control logic circuit 16 in which autocalibration is carried out to control an image position or image widths on a display monitor. Further, reference numeral 17 means a horizontal synchronizing input terminal from the control logic circuit 16, and 18 is a vertical synchronizing input terminal therefrom.

Figure 2:
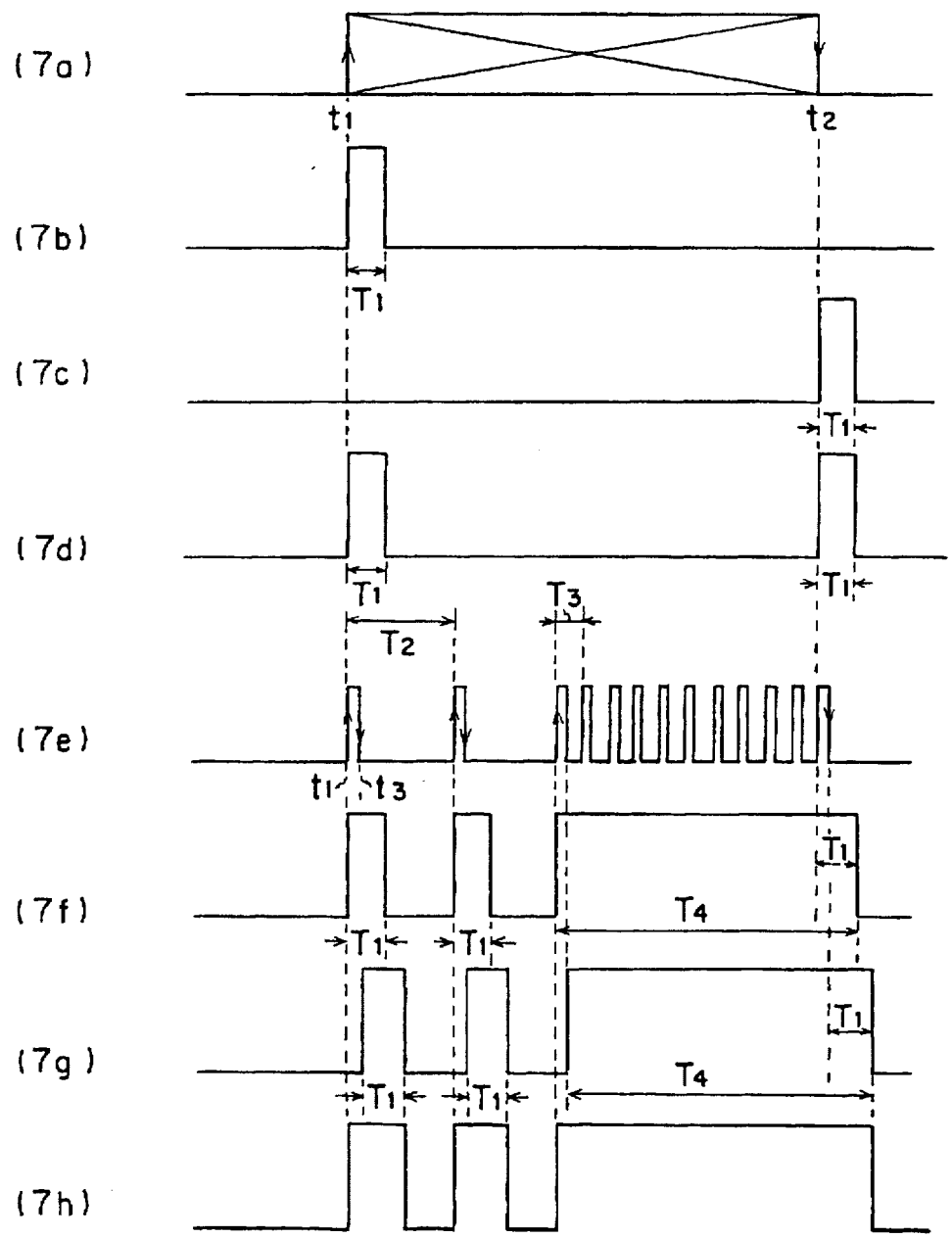
FIGS. 2A–2H are timing charts showing signals at points of the circuit of FIG. 1.

FIGS. 2A–2H are timing charts showing signals at the points of the circuit of FIG. 1. FIG. 2A shows a low frequency signal such as a full white signal inputted into the respective video input terminals 2a to 2c. FIGS. 2B and 2C show output signals from the monostable multivibrators 11 and 14, and FIG. 2D shows an output signal from the OR circuit 15. FIG. 2E shows a high frequency signal inputted into the respective video input terminals 2a to 2c, such as cross hatching or one dot signal. FIGS. 2F and 2G show output signals from the monostable multivibrators 11 and 14 corresponding to the signal shown in FIG. 2E, and FIG. 2H shows an output signal from the OR circuit 15.

First, the video input signals shown in FIG. 2A are inputted through the video input terminals 2a to 2c, and dc components of the video input signals shown in FIG. 2A are cut by the capacitors 19a to 19c. Thereafter, the signals shown in FIG. 2A are converted into signals biased by the resistors 20a to 20c, 21a to 21c, to be inputted into bases of the respective transistors 3a to 3c.

Since the resistor 4 is commonly connected to the emitters of the respective transistors 3a to 3c, the respective input signals are ORed, and the OR signal is clamped at predetermined dc voltage by the capacitor 5 and the clamping circuit 6. In the non-inverting amplifier 8 at a subsequent stage, micro signal voltage of the dc voltage output is transformed into transistor-transistor logic level voltage.

On the other hand, the monostable multivibrator 11 latches the transformed signal at a rise time $t_1$ of the signal so as to output the signal shown in FIG. 2B. A high level holding time $T_1$ of the monostable multivibrator 11 is predetermined by values of the resistor 9 and the capacitor 10.

As in the above operation, the monostable multivibrator 14 latches the output signal from the non-inverting amplifier 8 at a fall time $t_2$ of the signal so as to output the signal shown in FIG. 2C. A high level holding time $T_1$ of the monostable multivibrator 14 is predetermined by values of the resistor 12 and the capacitor 13. The output signals shown in FIGS. 2B and 2C of the respective monostable multivibrators 11 and 14 are ORed in the OR circuit 15 which outputs the signal shown in FIG. 2D.

High frequency signals such as the video input signals shown in FIG. 2E may be inputted into the video input terminals 2a to 2c. In this case, when a cycle $T_2$ of the video input signal shown in FIG. 2C is longer than the high level holding time $T_1$, output from the monostable multivibrators 11 and 14 are transformed to have an output waveform including a pulse width $T_1$ like the output signals shown in FIGS. 2F and 2G.

In contrast with this, when an input signal has, for example, a cycle $T_3$ shorter than the high level holding time $T_1$, the output from the monostable multivibrators are transformed to have another output waveform including one pulse $T_4$. Therefore, the output signals shown in FIGS. 2F and 2G of the monostable multivibrators 11 and 14 are ORed in the OR circuit 15 which outputs the signal shown in FIG. 2H. As set forth above, it is possible to detect any video signal irrespective of a low frequency video signal or a high frequency video signal.

Subsequently, the control logic circuit 16 calculates a difference in time between the output of the OR circuit 15 and the horizontal and vertical synchronizing signals to control the image position, the image widths and so forth on the display monitor. The control is made by using a logic circuit including a flip-flop, a counter, a microprocessor, and so forth.

Embodiment 2

Figure 3:
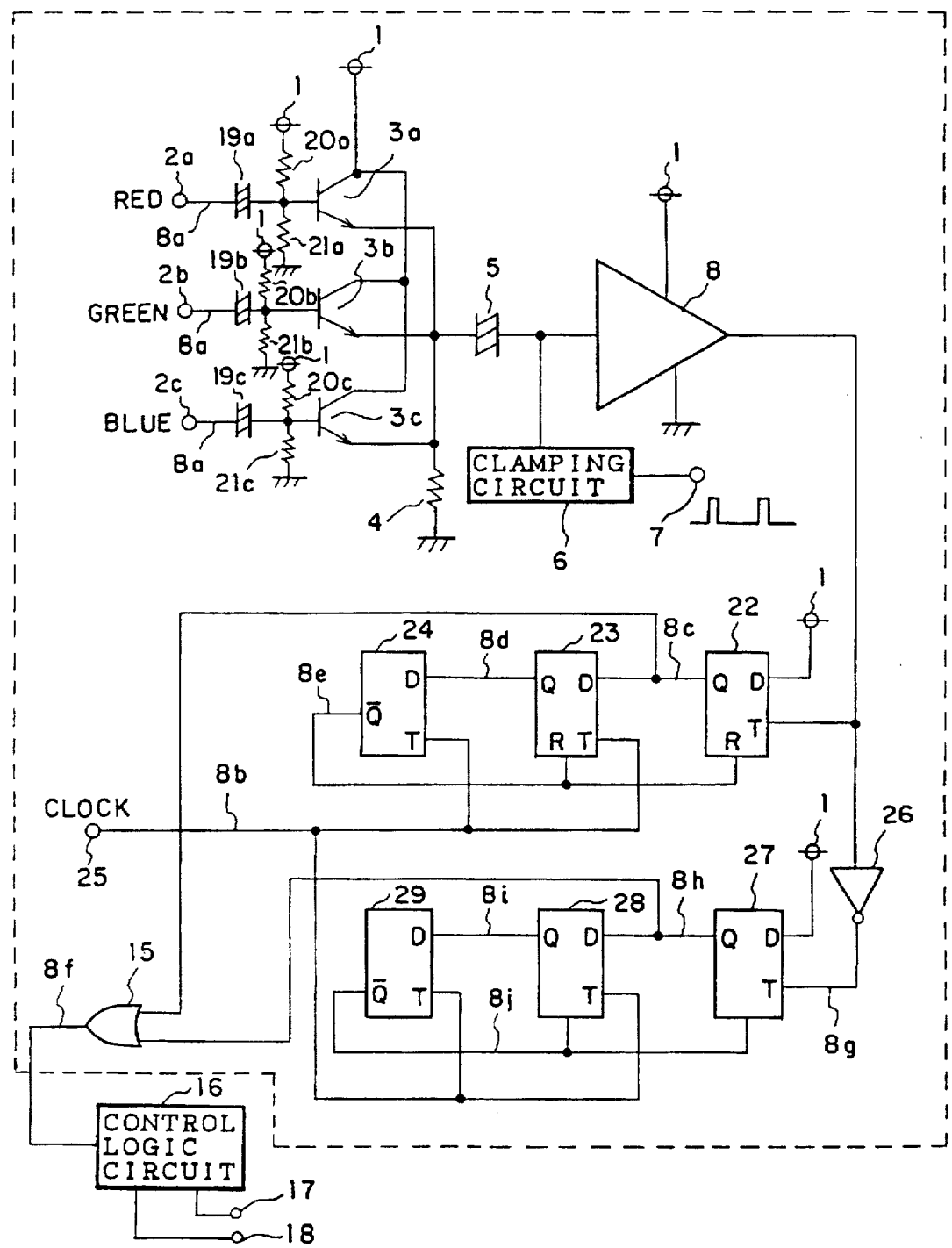
FIG. 3 is a circuit diagram showing another embodiment of the video signal detecting apparatus of the present invention.

FIG. 3 shows another embodiment of the present invention. In the drawing, reference numeral 26 means an inverter circuit to invert an output signal from a non-inverting amplifier 8, 22 is a flip-flop serving as a first latch circuit for receiving the output from the non-inverting amplifier 8, and 27 is a flip-flop serving as a second latch circuit receiving, after inversion in the inverter circuit 26, the output from the non-inverting amplifier 8.

Reference numerals 23 and 24, and 28 and 29 mean flip-flops connected in series to the flip-flops 22 and 27. Output of the flip-flops 22 and 27 are respectively inputted into an OR circuit 15 as in the above embodiment. Reference numeral 25 means a clock input terminal to supply clock to the flip flops 22, 23, 27, and 28. Further, the same reference numerals are used for component part identical with those shown in FIG. 1, and descriptions thereof are omitted.

Figure 4:
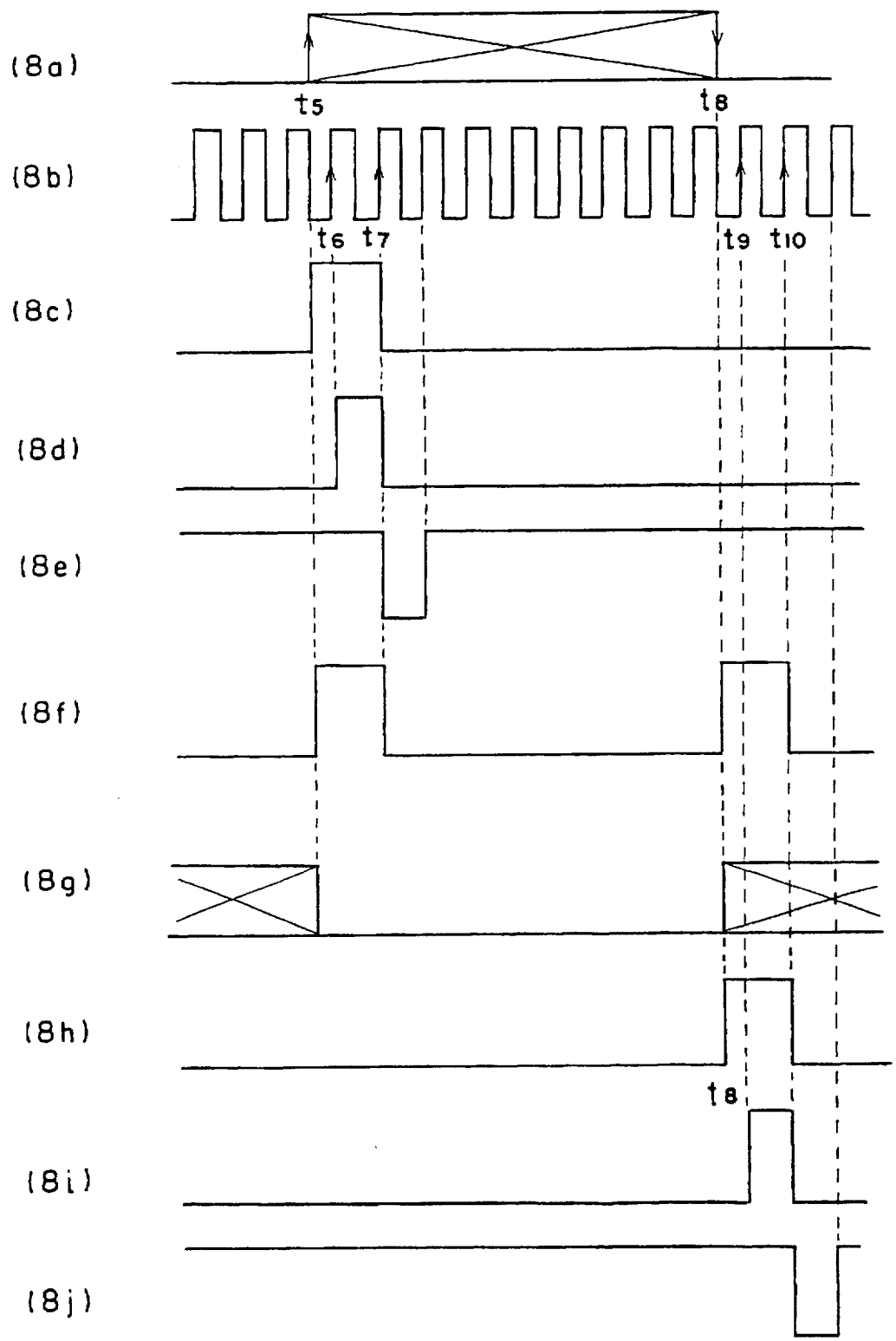
FIGS. 4A–4J are timing charts showing signals at points of the circuit of FIG. 3.

FIGS. 4A–4J are timing charts showing signals at the points of the circuit of FIG. 3. FIG. 4A shown a video input signal inputted into video input terminals 2a to 2c, and FIG. 4B shows the clock supplied to the flip-flops 23, 24, 28, and 29 through the clock input terminal 25. The flip-flops 22, 23, 24, 27, 28 and 29 output signals shown in FIGS. 4C–4J. Further, FIG. 4F shows an output signal from the OR circuit 15, and FIG. 4B shows an output signal from the inverter 26.

In the embodiment, a signal whose voltage is transformed by the non-inverting amplifier 8 can serve as an input trigger pulse for the flip-flops 22 to 24 to latch at a rise time, and for the inverter 26 and the flip-flops 27 to 29 to latch at a fall time.

That is, when the video input signals shown in FIG. 4A are inputted into the input terminals 2a to 2c, the output signal shown in FIG. 4B of the flip-flop 22 reaches a high level at a rise time $t_5$, and the output signal shown in FIG. 4D of the flip-flop 23 reaches a high level at a rise time $t_6$ of the clock signal shown in FIG. 4B. On the other hand, the output signal shown in FIG. 4E of the flip-flop 24 reaches a low level at a rise time $t_7$ of the clock signal to reset the flip-flops 22 and 23.

The output signal shown in FIG. 4G, the video input signal inverted by the inverter 26, has a rise which can serve as a trigger pulse for the flip-flop 27. The output signal shown in FIG. 4H of the flip-flop 27 becomes high at a rise time $t_8$ of the signal shown in FIG. 4G, and the output signal shown in FIG. 4I of the flip-flop 28 becomes high at a rise time $t_g$ of the clock signal. Subsequently, the output signal shown in FIG. 4J of the flip-flop 29 becomes low at a rise time $t_{10}$ of the next clock signal to reset the flip-flops 27 and 28. The output signals shown in FIGS. 4C and 4H of the flip-flops 22 and 27 are ORed in the OR gate 15 to output the signal shown in FIG. 4F.

As described above, it is possible to reliably detect a high frequency video input signal by using the flip-flops 22 to 24, and 27 to 29 for latching in response to a rise and a fall in the video input signal, and by using the clock.

Embodiment 3

Figure 5:
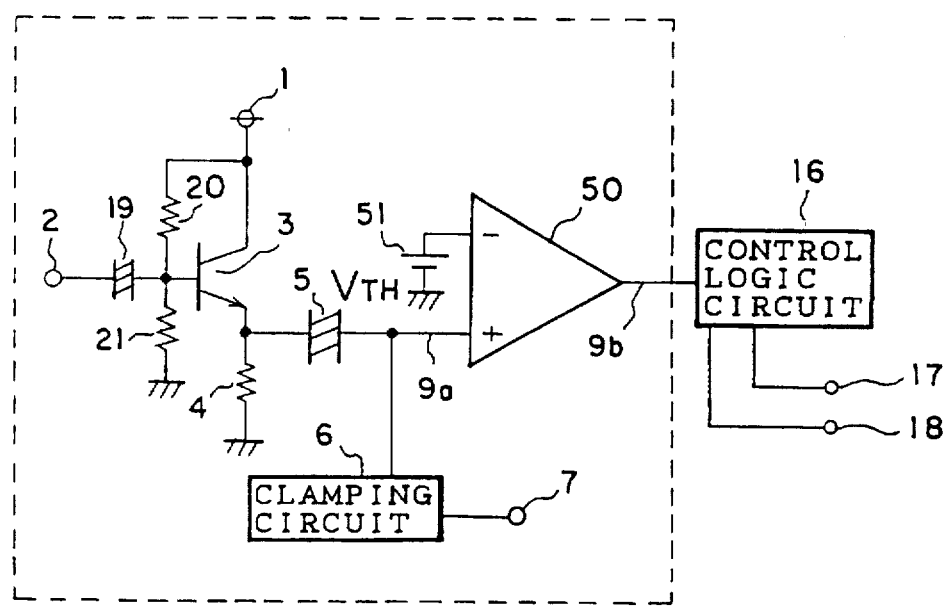
FIG. 5 is a circuit diagram showing still another embodiment of the video signal detecting apparatus of the present invention.

FIG. 5 is a circuit diagram showing still another embodiment of the video signal detecting apparatus of the present invention. In the drawing, reference numeral 50 means a comparator, and 51 is a threshold voltage source connected to one negative input terminal of the comparator 50 to set reference voltage $V_{TH}$.

A dc component cutting capacitor 5 and a clamping circuit 6 are connected to the other positive input terminal of the comparator 50. A control logic circuit 16 identical with that in the above embodiment is connected to an output terminal of the comparator 50. The same reference numerals are used for component parts identical with those in FIG. 3, and descriptions thereof are omitted. A circuit in FIG. 5 does not have three video input terminals 2a, 2b, and 2c as shown in FIGS. 1 and 3, but has only one input terminal 2 taking as input a video input signal.

Figure 6:
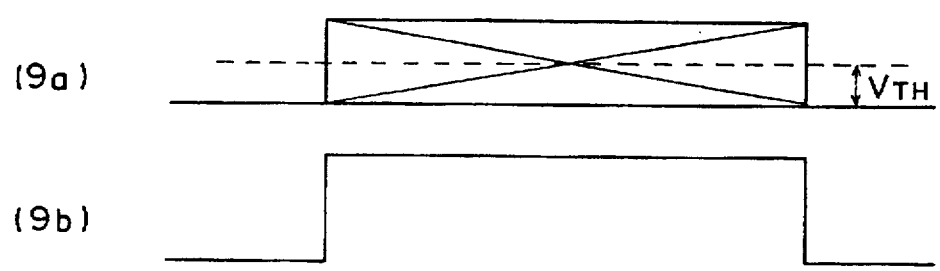
FIGS. 6A and 6B are timing charts showing signals at points of the circuit of FIG. 5.

FIG. 6 is a time chart showing signals at the points of the circuit of FIG. 5. FIG. 6A shows a video input signal inputted into the video input terminal 2, and FIG. 6B shows is an output signal of the comparator 50.

In the embodiment, the video input signal is clamped by a clamping circuit 6 at predetermined dc voltage to become a video input signal as shown in FIG. 6A. The video input signal shown in FIG. 6A is inputted into a positive input terminal of the comparator 50. The comparator 50 compares the reference voltage $V_{TH}$ of the threshold voltage source 51 with the video input signal shown in FIG. 6A to output a high level signal as the output signal shown in FIG. 6B within a period in which the video input signal shown in FIG. 6A exceeds the reference voltage $V_{TH}$.

That is, in the embodiment, the video signal is detected by detecting that the video input signal inputted into the comparator 50 has a higher level than that of the reference voltage.

Embodiment 4

Figure 7:
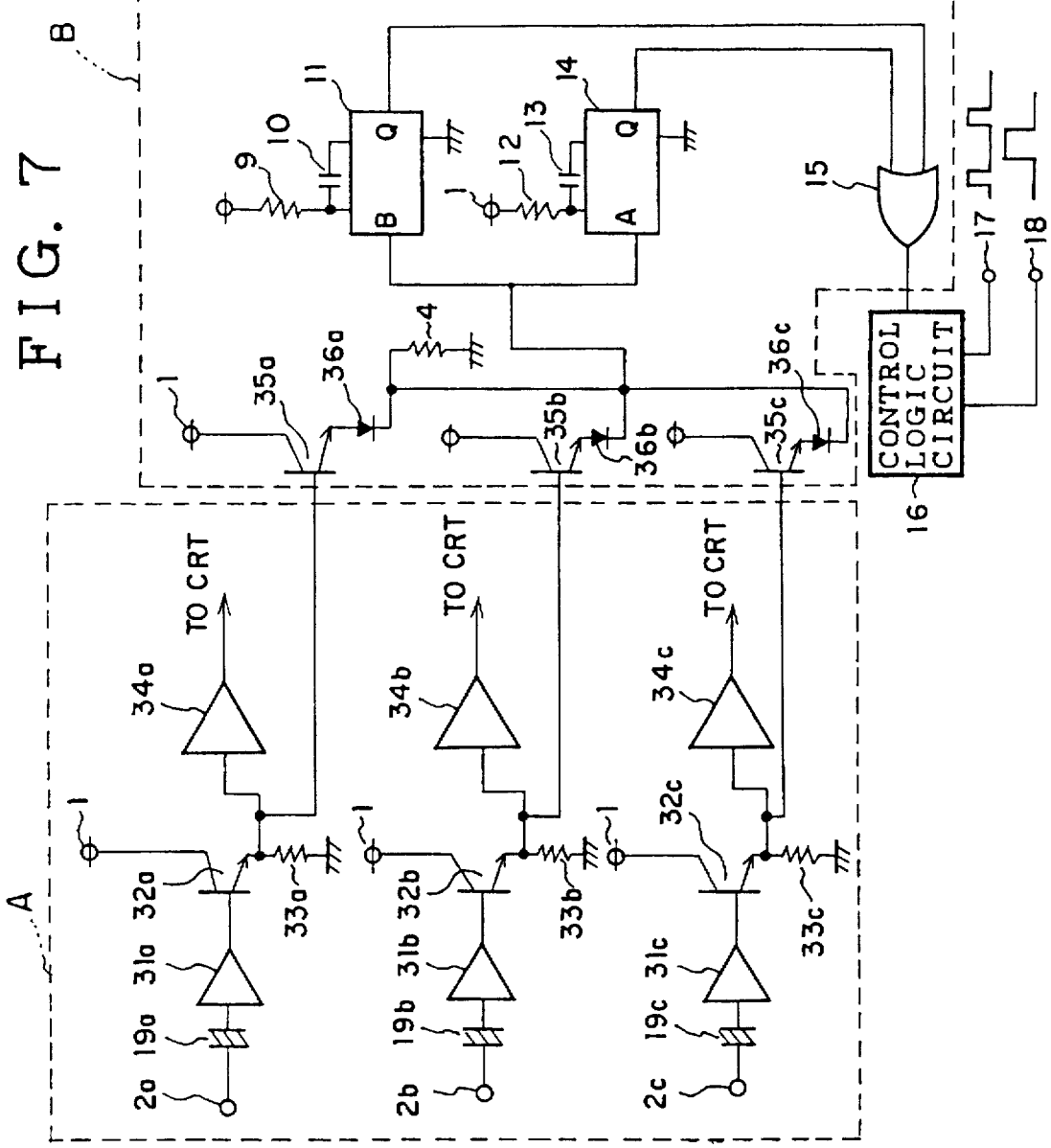
FIG. 7 is a circuit diagram showing a further embodiment of the video signal detecting apparatus of the present invention.

FIG. 7 shows a further embodiment of the video signal detecting apparatus of the present invention. In the drawing, reference numeral A means a video circuit, and B is a detecting/converting circuit. In the video circuit A, reference numerals 2a to 2c mean video input terminals, 19a to 19c are dc component cutting capacitors, and 31a to 31c are pre-amplifiers respectively connected to the capacitors 19a to 19c.

Further, reference numerals 32a to 32c mean buffer transistors serving as buffer devices, 33a to 33c are emitter resistors for the respective buffer transistors 32a to 32c, and 34a to 34c are main amplifiers to amplify voltage generated in the emitter resistors 33a to 33c. Output of the main amplifiers 34a to 34c are connected to a cathode-ray tube (CRT).

In the detecting/converting circuit B, reference numerals 35a to 35c mean transistors to take each video input signal from the video circuit A into their bases, and 36a to 36c are diodes connected to emitters of the respective transistors 35a to 35c, thereby forming a level shifting circuit. Reference numeral 4 means a resistor commonly connected between the respective diodes 36a to 36c and the ground. Output from the three diodes are ORed to be supplied to the resistor.

The OR output is inputted through connection into monostable multivibrators 11 and 14. The same reference numerals are used for component parts identical with those in FIG. 1, and descriptions thereof are omitted.

In the embodiment, the video circuit A includes a typical video amplifier circuit. Further, a dc component of a micro video input signal is cut by the capacitors 19a to 19c, and the video input signal is clamped by the pre-amplifiers 31a to 31c to dc voltage at a predetermined level, and is amplified to voltage having amplitude ranging from 3 to 5 V.

In order to drive the main amplifiers, the amplified signal is inputted into the buffer transistors 32a to 32c, and voltage output are fetched from the emitter resistors 33a to 33c to be respectively inputted into cathodes of the cathode-ray tube through the main amplifiers 34a to 34c.

On the other hand, the signals fetched from the emitter resistors 33a to 33c are level shifted to predetermined dc voltage by the level shifting circuit including the transistors 35a to 35c and the diodes 36a to 36c. Thereafter, the signals are inputted into the monostable multivibrators 11 and 14 as trigger signals.

The monostable multivibrators 11 and 14 latch the signal inputted as the trigger signals according to rise timing and fall timing. Two output from the monostable multivibrators 11 and 14 are ORed. Depending upon a time difference between the ORed signal and horizontal and vertical synchronizing signals, a control logic circuit 16 controls an image position, image widths and so forth on a display monitor.

Embodiment 5

Figure 8:
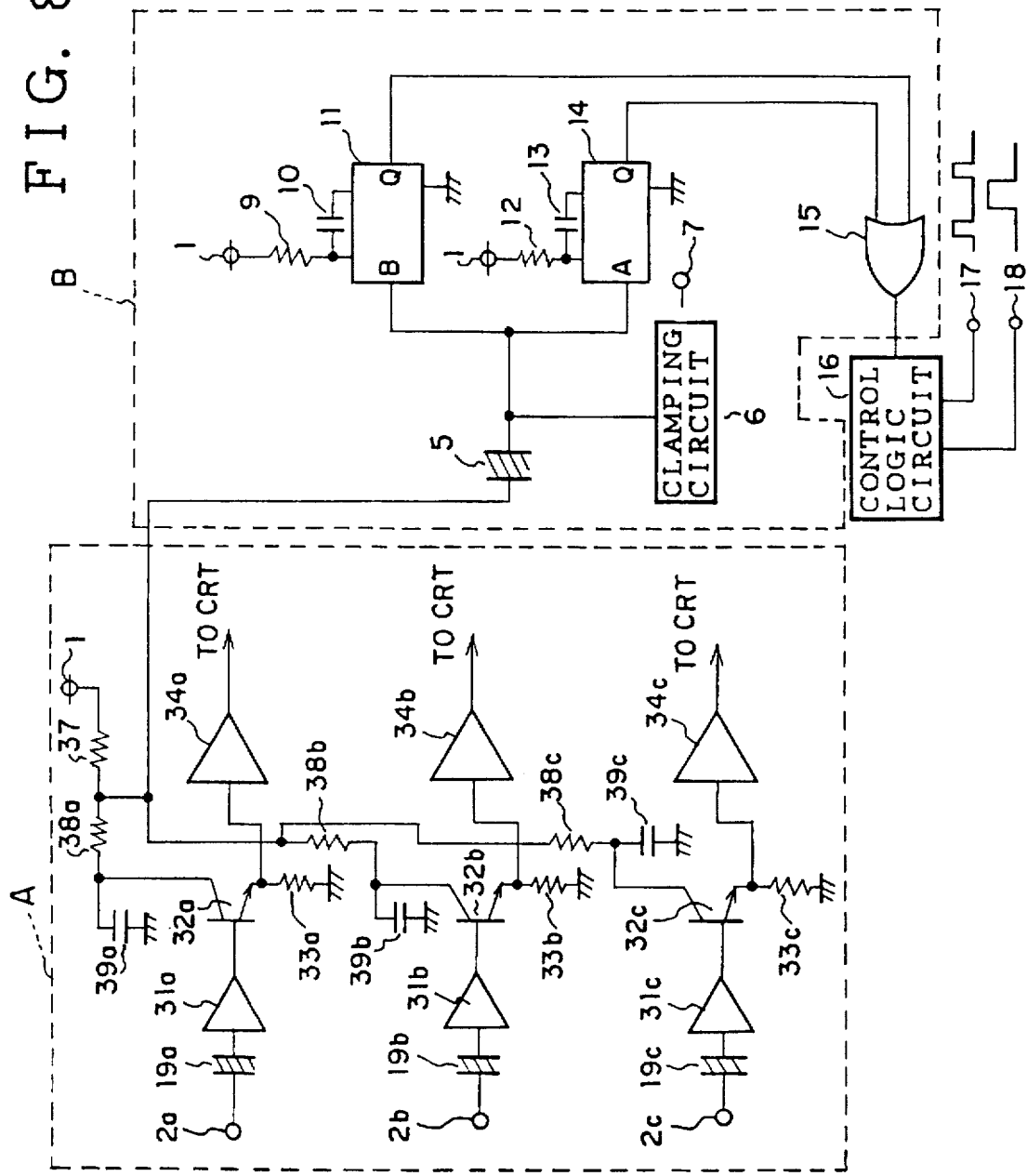
FIG. 8 is a circuit diagram showing a still further embodiment of the video signal detecting apparatus of the present invention.

FIG. 8 is a circuit diagram showing a still further embodiment of the video signal detecting apparatus of the present invention. In the embodiment, the circuit shown in FIG. 7 is partially modified. Reference numerals 37, and 38a to 38c mean collector resistors connected in series to collectors of buffer transistors 32a to 32c.

Further, reference numerals 39a to 39c mean capacitors. Nodes between the resistor 37 and the respective resistors 38a to 38c are connected to input terminals of monostable multivibrators 11 and 14 through a dc component cutting capacitor 5.

In the embodiment, the resistor 37, the resistors 38a to 38c, and the capacitors 39a to 39c discretely supply power to the collectors of the buffer transistors 32a to 32c in red, green, and blue video signal input circuits.

The signal which varies depending upon level of input video signal are obtained from the node between the resistor 37 and the resistors 38a to 38c. The monostable multivibrators 11 and 14 take in the obtained signal to perform a latch operation according to rise timing and fall timing of the signals. As in the above embodiment, depending upon the OR of these output signals, it is possible to control an image position and so forth on a display monitor.

Embodiment 6

Figure 9:
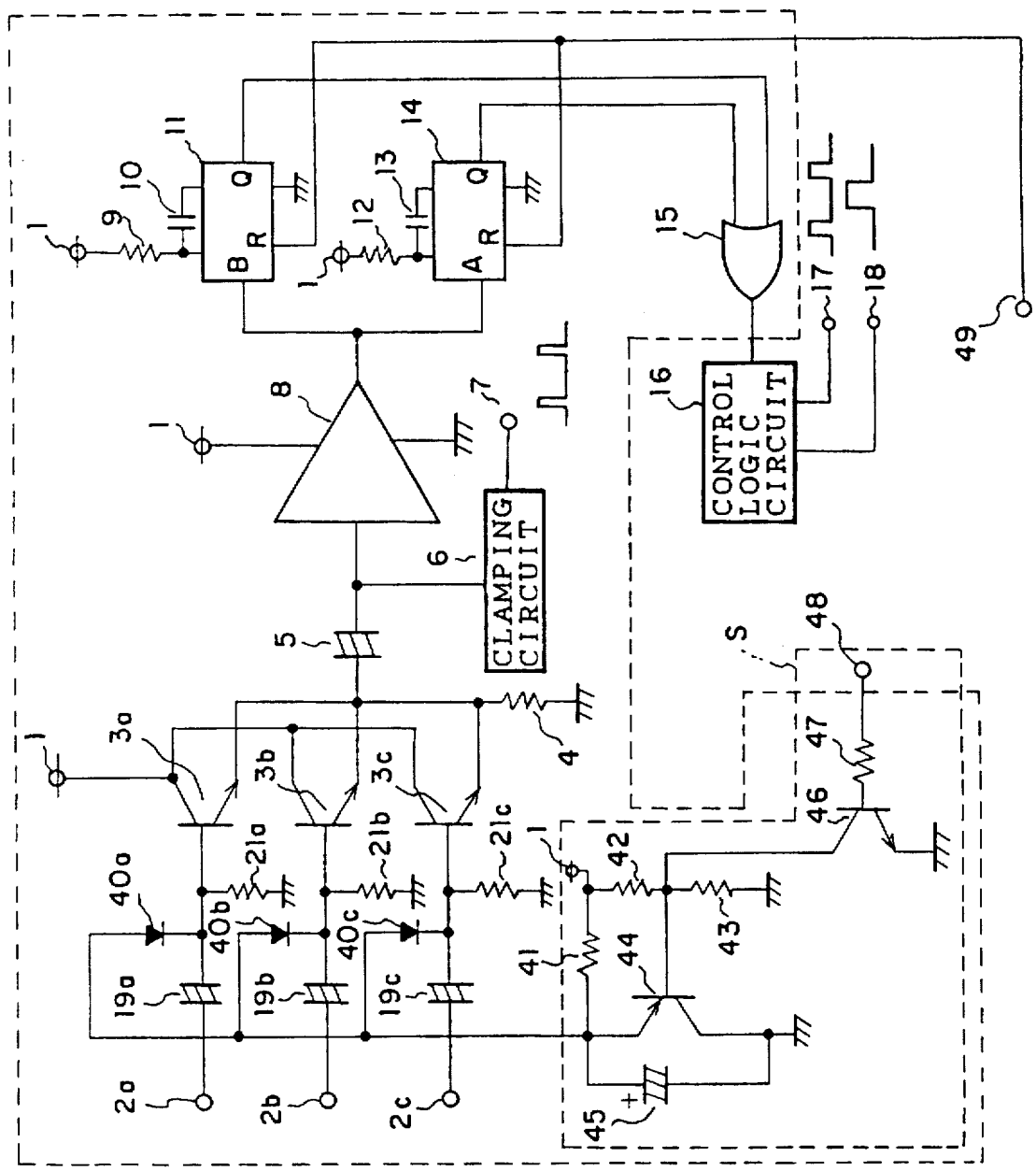
FIG. 9 is a circuit diagram showing still another embodiment of the video signal detecting apparatus of the present invention.
Figure 10:
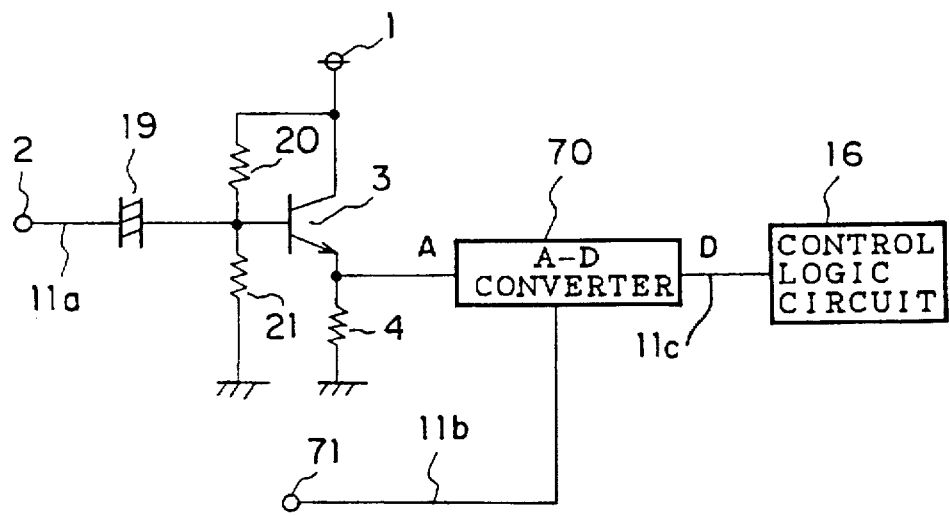
FIG. 10 is a circuit diagram showing one embodiment of a structure of a conventional video signal detecting apparatus.
Figure 11:
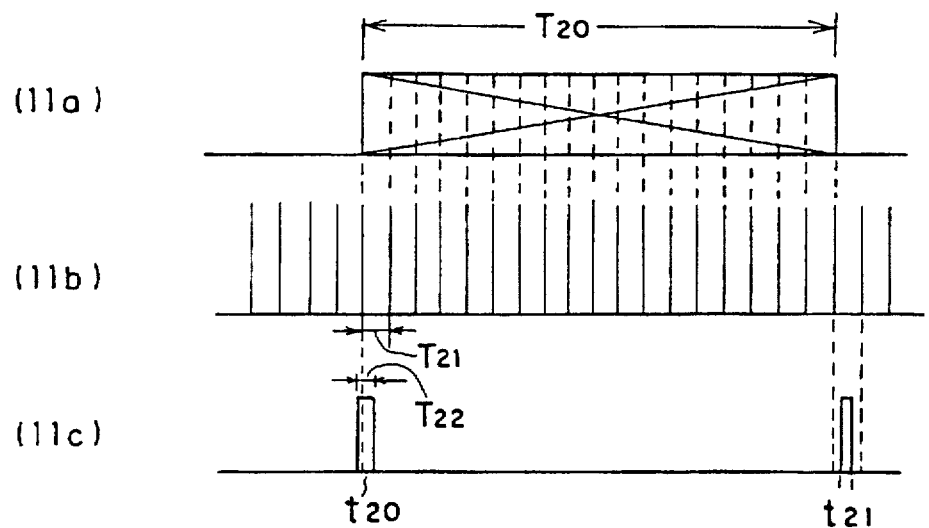
FIGS. 11A–11C are timing charts showing signals at points of the circuit of FIG. 10.

FIG. 9 is a circuit diagram showing still another embodiment of the video signal detecting apparatus of the present invention. In the embodiment, new technical matters are added to the embodiment shown in FIG. 1. Reference numerals 21a to 21c mean resistors connected to bases of transistors 3a to 3c, and 40a to 40c are diodes whose cathodes are connected to the bases of the respective transistors 3a to 3c. Anodes of the diodes 40a to 40c are connected to the emitter of transistor 44.

The collector of the transistor 44 is grounded, and a capacitor 45 is connected between the collector and the emitter. Further, the emitter of the transistor 44 is connected to a power source via resistor 41. Reference numerals 42 and 43 are bias resistors connected to the base of the transistor 44.

Reference numeral 46 means a switching transistor whose collector is connected to the base of the transistor 44, and whose emitter is grounded. A control signal input terminal 48 is connected to a base of the transistor 46 via the base resistor 47. A switch circuit S includes the transistors 44, 46, the resistors 41 to 43, 47, the capacitor 45, and the control signal input terminal 48. Further, control signal input terminal 49 is connected to reset input terminals of monostable multivibrators 11 and 14.

In this embodiment, video input signals are inputted into video input terminals 2a to 2c, and dc components of the signals are cut by dc component cutting capacitors 19a to 19c. Subsequently, dc biases are applied to the video input signals by the diodes 40a to 40c and resistors 21a, 21b and 21c. Here, the resistor 41, the transistor 44, and the capacitor 45 form a bias supply circuit to supply sufficient bias power. The dc bias is applied to the video input signals through the diodes 40a to 40c.

Further, the dc bias of the transistor 44 can be set at zero volts by the switching transistor 46 to turn ON/OFF the transistor 44, thereby turning OFF the transistors 3a to 3c. Therefore, it is possible to cut off transmission of high frequency signals such as video input signal to circuits in the next and later stages.

Alternatively, control signals can be inputted into the reset terminals of the monostable multivibrators 11 and 14 through the control signal input terminal 49 into which the signals are supplied for ON-OFF operations. Thus, by terminating operations of the monostable multivibrators 11 and 14, it is also possible to cut off the transmission of the high frequency signals such as video input signal to the circuits in the next and later stages.

While preferred embodiments of the invention have been described using specific terms, such description is for illustrative purposes only, and it is to be understood that changes and variations may be made without departing from the spirit or scope of the following claims.

What is claimed is:

1. A video signal detecting apparatus for detecting an input video signal, said video signal detecting apparatus comprising:

an input circuit which receives said input video signal and produces an output signal including image data;

a first latch circuit arranged to receive said output signal to latch in response to a rise of said output signal;

a second latch circuit arranged to receive said output signal to latch in response to a fall of said output signal; and an OR circuit arranged to receive an output of said first latch circuit and an output of said second latch circuit in which said output of said first latch circuit and said output of said second latch circuit are ORed to output the OR output as a video detecting signal.

2. A video signal detecting apparatus according to claim 1, wherein said first latch circuit has a first monostable multivibrator to output a pulse having a first predetermined width, and said second latch circuit has a second monostable multivibrator to output a pulse having a second predetermined width.

3. A video signal detecting apparatus according to claim 2, wherein said input circuit includes a clamping circuit to clamp said input video signal, wherein said first and second latch circuits are latched depending upon the clamped video signal.

4. A video signal detecting apparatus according to claim 3, wherein said input circuit includes a non-inverting amplifier for non-inverting amplification of said video signal clamped by said clamping circuit, wherein said first and second latch circuits are latched depending upon said clamped video signal.

5. A video signal detecting apparatus according to claim 4, further comprising a control logic circuit to decide a position of an image area of said video signal with respect to horizontal and vertical synchronizing pulses depending upon output from said OR circuit and the horizontal and vertical synchronizing pulses so as to calculate and control for automatic adjustment of a position and horizontal and vertical widths of an image on a display.

6. A video signal detecting apparatus according to claim 5, further comprising a switch circuit to cut off input of said video signal when said control logic circuit does not have to adjust a position and horizontal and vertical widths of an image on a display.

7. A video signal detecting apparatus according to claim 1, wherein said first latch circuit includes a first flip-flop which performs a latch operation by taking said output signal as a trigger signal, and which is reset depending upon a clock signal having a higher frequency than that of said output signal, and said second latch circuit includes an inverter to invert said output signal, and a second flip-flop which performs a latch operation by taking a signal from said inverter as a trigger signal and which is reset depending upon said clock signal.

8. A video signal detecting apparatus according to claim 7, wherein said input circuit comprises a clamping circuit to clamp said input video signal, wherein said first and second latch circuits perform a latch operation depending upon the clamped signals.

9. A video signal detecting apparatus according to claim 8, wherein said input circuit comprises a non-inverting amplifier for non-inverting amplification of a video signal clamped by said clamping circuit, wherein said first and second latch circuits are latched depending upon an output signal of said non-inverting amplifier.

10. A video signal detecting apparatus according to claim 9, further comprising a control logic circuit to decide a position of an image area of said video signal with respect to horizontal and vertical synchronizing pulses depending upon output from said OR circuit and the horizontal and vertical synchronizing pulses so as to calculate and control for automatic adjustment of a position and horizontal and vertical widths of an image on a display.

11. A video signal detecting apparatus according to claim 7, wherein said first and second flip-flops are reset when detection of said input video signal is unnecessary.

12. A video signal detecting apparatus according to claim 1, wherein said input circuit comprises a pre-amplifier to amplify and clamp said input video signal, and a buffer amplifier to buffer and amplify an output from said pre-amplifier, wherein said first and second latch circuits perform a latch operation depending upon an output signal from said buffer amplifier.

13. A video signal detecting apparatus according to claim 12, wherein said buffer amplifier includes a transistor whose collector is supplied with power through a resistor, and a signal generated at said resistor is supplied to said first and second latch circuits.

14. A video signal detecting apparatus comprising:

a clamping circuit to clamp an input composite video signal to produce a clamped composite video signal;

a comparator for comparing said clamped composite video signal with a predetermined dc voltage so as to output a signal according to a result of said comparing; and a control logic circuit for deciding a position of an image area of said input video signal with respect to horizontal and vertical synchronizing pulses depending upon said signal output from said comparator and the horizontal and vertical synchronizing pulses so as to calculate and control automatic adjustment of a position and horizontal and vertical widths of an image on a display.

* * * * *